United States Patent [19]
Beckerman et al.

[11] 4,329,933
[45] May 18, 1982

[54] UNIVERSAL EXPANSION MODULE

[75] Inventors: Howard L. Beckerman, Middletown; Robert Sedlatschek, Bridgewater, both of N.J.

[73] Assignee: The Singer Company, Stamford, Conn.

[21] Appl. No.: 276,430

[22] Filed: Jun. 22, 1981

[51] Int. Cl.³ .............................................. D05B 3/02
[52] U.S. Cl. ............................ 112/158 E; 112/121.11
[58] Field of Search .......... 112/158 E, 121.11, 121.12; 340/146.3 Z, 707

[56] References Cited
U.S. PATENT DOCUMENTS

| | | |
|---|---|---|
| 3,025,809 | 3/1962 | Ayres. |
| 4,085,691 | 4/1978 | Coughenour et al. |
| 4,092,937 | 6/1978 | Landau, Jr. et al. |
| 4,154,178 | 5/1979 | Brown et al. ................... 112/158 E |
| 4,160,422 | 7/1979 | Barber et al. .................. 112/121.11 |
| 4,290,375 | 9/1981 | Tonomura et al. ............ 112/121.12 |
| 4,301,753 | 11/1981 | Meier .......................... 112/158 E X |

*Primary Examiner*—Peter P. Nerbun
*Attorney, Agent, or Firm*—Robert E. Smith; Edward L. Bell; James M. Trygg

[57] ABSTRACT

The combination of an electronically controlled sewing machine and an auxiliary memory comprising pages of a book, or the like, each page having optical bar coded stitch pattern data printed thereon and in obvious association with a graphic representation of the actual stitch pattern. The coded data is sensed by a hand held optical reader which transfers the data, for a desired stitch pattern, to internal memory of the sewing machine.

6 Claims, 1 Drawing Figure

UNIVERSAL EXPANSION MODULE

DESCRIPTION

BACKGROUND OF THE INVENTION

This invention relates to an electronically controlled sewing machine having an electronic memory for storing stitch pattern information. The stored information is accessed in such a way that it controls the stitch forming instrumentalities when sewing a stitch pattern.

Such sewing machines are well known in the art. See for example, U.S. Pat. No. 4,092,937, issued on June 6, 1978, to Landau, Jr. Et al, the teachings of which are incorporated herein by reference. Landau Jr. discloses a programmable sewing machine having internal memory for storing stitch pattern and other related data for controlling the sewing operation of the machine. A major disadvantage of this type of sewing machine is that a finite number of stitch patterns, usually a relatively small number, may be stored in the memory. This imposes a substantial limitation on the repertoire of stitch patterns that may be available for sewing on the machine thereby affecting its value to the consumer.

U.S. Pat. No. 4,160,422, issued on July 10, 1979 to Barber et al, the teachings of which are incorporated herein by reference, discloses a programmable sewing system including a sewing machine having an internal memory for storing stitch pattern data for controlling the sewing operation of the machine. An auxiliary memory unit is provided for storing stitch pattern data which may be entered into the internal memory of the sewing machine for sewing a particular stitch pattern or a series of stitch patterns. The auxiliary memory unit is capable of receiving a replaceable memory medium such as a tape cassette or floppy disc, which can accommodate a relatively large quantity of stitch pattern data. Economic realities and other considerations generally require that many stitch patterns be stored on a given cassette or disc. A major disadvantage of this system is that the stitch pattern data residing on the tape or disc for a particular stitch pattern is not readily identifiable by the operator. The operator must perform an extremely difficult and tedious search of the magnetic cassette tape or disc which may contain hundreds of different stitch patterns in order to locate the desired one.

Another disadvantage of this system is the difficulty of adding a new stitch pattern to the auxiliary memory. Should a sewing machine manufacturer wish to make available a new stitch pattern to all its customers having such a system, it would have to distribute to each customer a replacement cassette tape or disc hwaving all the old stitch patterns including the new one, or it would have to distribute a cassette tape or disc containing only the new stitch pattern and provide a means by which it may be added to the existing tape or disc. The first solution would be impractical if the cassette tapes in the field were not identical; that is, if they contained different collections of stitch patterns to meet the varying needs of individual customers. The manufacturer would probably not want to incur the expense and administrative work involved in keeping track of these various configurations. The second solution is equally undersirable since there would be substantial cost involved in providing each customer with a cassette tape or disc having a single stitch pattern recorded thereon.

What is needed is a storage medium that is not adversely affected by direct operator handling, requires no special enclosure, and can economically contain data for a single stitch pattern. There should be some means by which the operator may easily identify data stored within the storage medium through a visual representation of the stitch pattern that is embodied in the data.

SUMMARY OF THE INVENTION

The present invention overcomes these difficulties of the prior art by providing for an electronically controlled sewing machine, an auxiliary memory unit having a replaceable memory media. The replaceable memory media contains a graphic representation, affixed thereto, of a particular stitch pattern and is proximately associated with the corresponding stitch pattern data that is to be entered into the internal memory of the sewing machine.

It is another object of this invention to provide a simplified means by which desired stitch pattern data may be entered into the internal memory.

It is another object of this invention to provide a replaceable memory media that is not adversely affected by normal operator handling and requires no special enclosure or like mechanism for storage.

It is another object of this invention to provide a storage medium that can economically contain coded data for a single stitch pattern.

Other objects and advantages of the invention will become apparent through reference to the accompanying drawing and descriptive matter which illustrate a preferred embodiment of this invention.

According to the present invention, there is provided an electronically conytrolled sewing machine having stitch forming instrumentalities for sewing stitch patterns, an electronic memory means for storing stitch pattern data, and a control means influenced by the stitch pattern data stored in the memory means for effecting and regulating movement of at least one of the stitch forming instrumentalities. The improvement comprises an auxiliary memory means including a sheet having a machine readable code carried thereby related to a predetermined stitch pattern together with a graphic representation of the stitch pattern, a reader means for sensing the code carried by the auxiliary memory means, and a logic means for converting the code sensed by the reader means into stitch pattern data and for storing the stitch pattern data in the electronic memory means.

BRIEF DESCRIPTION OF THE DRAWING

In order that the invention be more fully understood, it will now be described by way of example with reference to the accompanying drawing in which.

DETAILED DESCRIPTION OF THE INVENTION

Figure 1:
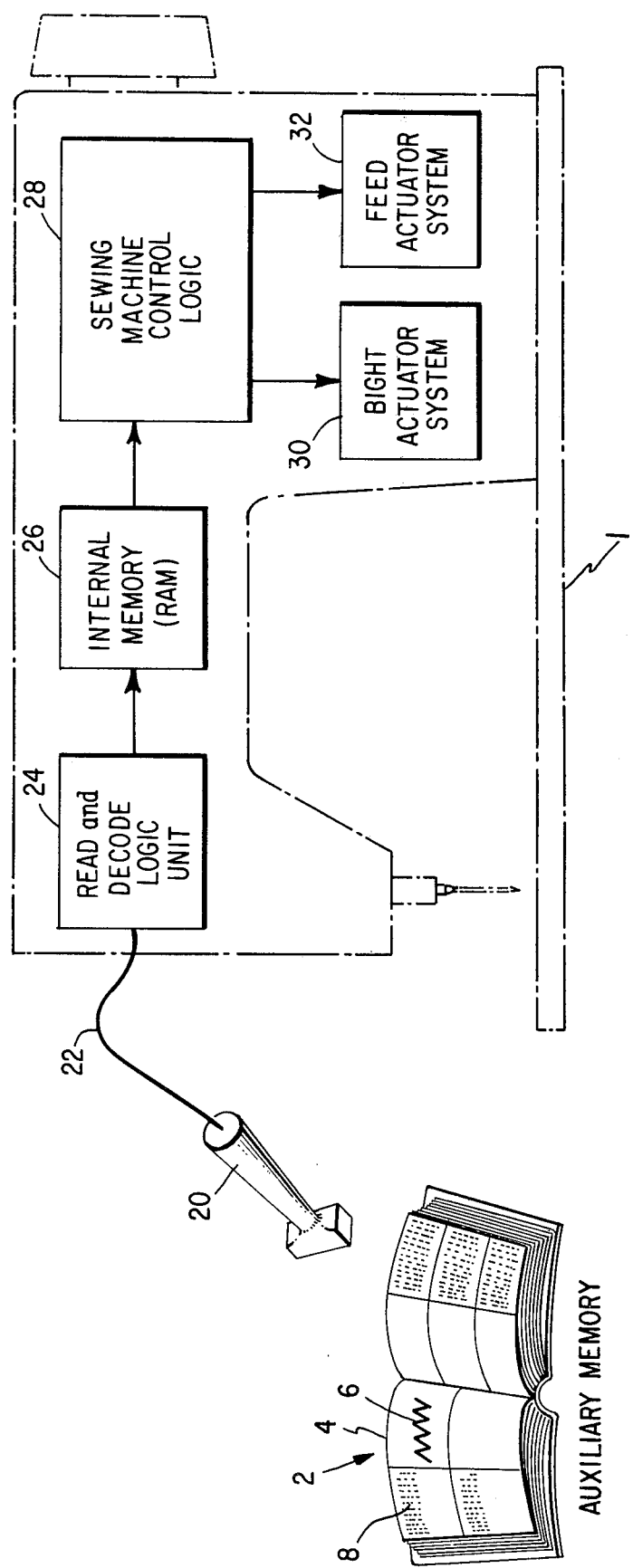
FIG. 1 is a block diagram of a sewing system having the present invention incorporated therein.

Referring to the block diagram of FIG. 1 there is shown a sewing machine 1 outlined in broken lines, an auxiliary memory generally indicated at 2, having a plurality of sheets or pages 4 which may be bound into a book or held in loose leaf arrangement with a suitable loose leaf binder or the like. Each sheet has at least one pair of elements affixed thereto or imprinted thereon. Each pair of elements consists of a graphic symbol 6 for visually identifying a specific stitch pattern and a machine readable code 8 which contains data that, when entered into the internal memory will cause the sewing machine to sew the stitch pattern depicted by the graphic symbol 6. The graphic symbols may be letters of the alphabet or other meaningful symbols such as an arrow head or the like, where appropriate. Any symbol which will serve to provide a visual indicator to the operator of the actual stitch pattern which is encoded in the associated machine readable code is acceptable for this purpose. The machine readable code 8, as shown in FIG. 1, is an optical bar code, however, any other suitable data storage medium may be used such as a strip of magnetic recording tape, punched holes, or the like. A hand held optical bar code reader 20 is utilized to sense the data content of the bar code and present digital signals representing the data content to the read and decode logic unit 24 via the circuit 22. The logic unit 24 will buffer the incoming data, perform various validation tests on the data, format it and store it in the random access internal memory (RAM) 26 of the sewing machine. The buffering, validation testing and data formating is performed in a manner that is notoriously well known in the art and need not be described further here. The sewing machine control logic 28 accesses the stitch pattern data stored in the RAM and develops control signals which are presented to the bight actuator system 30 and the feed actuator system 32. These control signals cause the bight and feed actuator systems to effect motion of the needle bar and work feed mechanism in timed relation with the other stitch forming instrumentalities of the sewing machine. The operation of the control logic 28 in accessing the internal memory 26 and controlling the bight and feed actuator systems 30, 32 is more fully described in U.S. Pat. No. 4,085,691, issued on Apr. 25, 1978 to Coughenour et al, the teachings of which are incorporated herein by reference, and U.S. Pat. No. 4,092,937, referred to above.

It will be understood that when the machine readable code 8 takes a form other than an optical bar code, the reader 20 must also be of a type suitable for sensing such code.

The significant principles characteristic of this invention lie in the unique combination of an auxiliary memory comprising sheets of paper, or other material, having machine readable stitch pattern data affixed or printed thereon and having, in obvious association with such data, a visual symbolic representation of the actual stitch pattern that may be sewn by a sewing machine having that data within its internal memory. With this arrangement it is quite simple and relatively economical for a sewing machine manufacturer to dissiminate coded data of new stitch patterns to its customers. For instance, an optical bar code of a new stitch pattern could be included in mass media advertisements such as would be appropriate for magazines, news papers, and commercial television.

While the preferred embodiment described above illustrates the principles of this invention with respect to an auxiliary memory consisting of sheets or pages of a book and a hand held reader, it is expressly understood that these principles may be applied to other similar structures such as an auxiliary memory consisting of loose sheets or cards stored in a box or similar container and/or a reader that is rigidly attached to or integral with the frame of the sewing machine. Such other structures are deemed to be within the scope and spirit of this disclosure. It is understood that the preferred embodiment described herein is for purposes of illustration only and not to be construed as a limitation of this invention.

We claim:

1. In combination with an electronically controlled sewing machine having stitch forming instrumentalities for sewing stitch patterns, an electronic memory means for storing stitch pattern data, and control means influenced by said stitch pattern data stored in said memory means for effecting and regulating movement of at least one of said stitch forming instrumentalities, the improvement comprising:
    a. auxiliary memory means including a sheet having a machine readable code carried thereby related to a predetermined stitch pattern together with a graphic representation of that stitch pattern,
    b. reader means for sensing said code carried by said auxiliary memory means, and
    c. logic means for converting said code sensed by said reader means into stitch pattern data and for storing said stitch pattern data in said electronic memory means.

2. The combination of claim 1 wherein said sheet comprises a page of a book.

3. The combination of claim 1 wherein said machine readable code includes an optical bar code imprinted thereon.

4. The combination of claim 1 wherein said machine readable code includes a magnetic tape strip attached thereto.

5. The combination of claim 1 wherein said reader means and said auxiliary memory means for sensing said code are relatively movable to each other for sensing said code carried by said auxiliary memory means.

6. The combination of claim 1 wherein said reader means is manually shiftable relative to said machine readable code for sensing and converting said code into stitch pattern data.

* * * * *